(12) United States Patent
Gasmer et al.

(10) Patent No.: US 11,659,794 B2
(45) Date of Patent: May 30, 2023

(54) WALL STRUCTURE ADAPTED FOR AQUEOUSLY GROWN MICROGREENS

(71) Applicant: Proterra Ag, Inc., Monrovia, CA (US)

(72) Inventors: Morris Gasmer, Whittier, CA (US); Martin Boerema, Whittier, CA (US); Geoffrey C. Landis, Whittier, CA (US)

(73) Assignee: Proterra Ag, Inc., Monrovia, CA (US)

( * ) Notice: Subject to any disclaimer, the term of this patent is extended or adjusted under 35 U.S.C. 154(b) by 158 days.

(21) Appl. No.: 16/821,940

(22) Filed: Mar. 17, 2020

(65) Prior Publication Data

US 2020/0383285 A1     Dec. 10, 2020

Related U.S. Application Data

(60) Provisional application No. 62/820,099, filed on Mar. 18, 2019.

(51) Int. Cl.
*A01G 31/00*     (2018.01)
*A01C 1/06*       (2006.01)

(52) U.S. Cl.
CPC .............. *A01G 31/00* (2013.01); *A01C 1/06* (2013.01)

(58) Field of Classification Search
CPC ........ A01G 20/20; A01G 9/033; A01G 9/025; A01G 31/00; A01C 1/06; A01C 1/044; A01C 1/04
See application file for complete search history.

(56) References Cited

U.S. PATENT DOCUMENTS

| | | | |
|---|---|---|---|
| 4,118,892 A * | 10/1978 | Nakamura | A01G 9/033 47/33 |
| 5,934,011 A | 8/1999 | Ishioka | |
| 2002/0134013 A1 | 9/2002 | Obonai et al. | |
| 2008/0295400 A1 | 12/2008 | Harwood et al. | |
| 2019/0029166 A1* | 1/2019 | Goodman | A01G 24/25 |
| 2020/0008376 A1 | 1/2020 | Harwood | |

FOREIGN PATENT DOCUMENTS

| | | |
|---|---|---|
| EP | 2425948 A2 | 3/2012 |
| JP | 10-084714 A | 4/1998 |
| JP | 2014-183846 A | 10/2014 |
| JP | 2014183846 A | 10/2014 |
| KR | 10-2005-0105829 A | 11/2005 |
| KR | 10-2009-0068684 A | 6/2009 |
| WO | 2015110554 A1 | 7/2015 |

(Continued)

OTHER PUBLICATIONS

KR20050105829A translation (Year: 2005).*

(Continued)

*Primary Examiner* — Monica L Perry
(74) *Attorney, Agent, or Firm* — KOS IP Law LLP

(57) ABSTRACT

Crops, for example microgreens, may be aeroponically grown from seed on substrates. The substrates may be seeded with the substrates in a horizontal position, and then arranged vertically for germination and further growth. A gelling material in solution, with the gelling material for example a gellum, may be applied to the substrates, while in the horizontal position, so that the seeds are retained on the substrates when the substrates are moved to a vertical position.

9 Claims, 8 Drawing Sheets

(56) References Cited

FOREIGN PATENT DOCUMENTS

WO    WO-2015181944 A1 * 12/2015  ............... A01G 2/00

OTHER PUBLICATIONS

International Search Report on related PCT Application No. PCT/US2020/023222 from International Searching Authority (KIPO) dated Jul. 21, 2020.
Written Opinion on related PCT Application No. PCT/US2020/023222 from International Searching Authority (KIPO) dated Jul. 21, 2020.
Extended European Search Report dated Oct. 11, 2022 issued in corresponding EP Appln. No 20774404.6.

* cited by examiner

WALL STRUCTURE ADAPTED FOR AQUEOUSLY GROWN MICROGREENS

CROSS REFERENCE TO RELATED APPLICATION

This application claims the benefit of the filing date of U.S. Provisional Patent Application No. 62/820,099, filed on Mar. 18, 2019, the disclosure of which is incorporated by reference herein.

BACKGROUND OF THE INVENTION

The present invention relates generally to systems and methods for aeroponically grown crops, and more particularly to vertically grown from seed aeroponic crops.

Aeroponically grown crops generally maintain roots of the crops in an aqueous rich environment, with the roots in a mist environment. The mist is formed using a liquid solution, with the mist providing water and nutrients for plant growth. The mist may be provided, for example, using micron sized nozzles.

Some aeroponic systems may grow crops on generally vertical walls. Generally in doing so, individual plants are first germinated and grown to an initially desired size in a generally horizontal plane in a nursery. The plants are then transplanted to the vertical walls for further growth. Unfortunately, this process may include significant labor in moving the plants, require separate nursery facilities, and potentially be deleterious to the plants.

BRIEF SUMMARY OF THE INVENTION

Aspects of some embodiments provide for adhering plant seeds relative to a substrate in a generally horizontal plane and then, prior to germination of the seeds, moving the substrate, with seeds, to a generally vertical plane for growth of the plants. In some embodiments the seeds are adhered in position relative to the substrate by a polymer layer. In some embodiments the polymer layer is a gel. In some embodiments the seeds are adhered in position relative to the substrate by distributing the seeds on the substrate and applying the polymer layer to the seeds and at least some of the substrate. In some embodiments adhering the seeds in position relative to the substrate comprises applying the polymer layer to at least some of the substrate and distributing the seeds onto the polymer layer. In some embodiments the polymer is applied as a solution, with the solution gelling or solidifying after application. In some embodiments the substrate lies in a generally horizontal plane, a gelling material and seeds are applied to a first side of the substrate, the gelling material forms a gel, and then, prior to seed germination, with the seeds generally held in relative position to the substrate by the gel, the substrate is placed in a generally vertical plane. In some embodiments a second side of the substrate (opposite the first side) is exposed to a mist environment.

In some embodiments the gelling material is applied to the first side of the substrate, for example as a solution, before the seeds are applied to the first side of the substrate, by way of being applied to the gelling material on the first side the substrate. After application, the gelling material may gel. In some embodiments one or more additional layers of gelling material are thereafter applied to the first side of the substrate, by way of being applied to the layer of gel or gelling material (and seeds, if exposed) already on the substrate. In some embodiments the seeds are applied to the first side of the substrate before the gelling material is applied to the first side of the substrate. In some embodiments the gel, or layers of the gel, have a wet thickness on the order of microns to millimeters.

In some embodiments the gel is a polymer. In some embodiments the gel is a hydrocolloid, for example a gelling type hydrocolloid. In some embodiments the hydrocolloid is a gellan. In some embodiments the gellan is Gelrite. In some embodiments the gellan is GELZAN®, a trademark of CP Kelco U.S., Inc. In some embodiments the hydrocolloid is an agar. In some embodiments one, some, or all of plant nutrients, plant hormones, or other additives conducive or promotive of plant health or growth are added to the gelling material or gel.

In some embodiments the substrate is of a woven material. In some embodiments the substrate is a fiber. In some embodiments the substrate is absorbent. In some embodiments the substrate is of a wicking material. In some embodiments the substrate is hydrophobic. In some embodiments the substrate is hydrophilic. In some embodiments the substrate is a screen. In some embodiments the substrate is a stamped material.

In some embodiments the substrate is fixed in a frame. In some embodiments the substrate is stretched within the frame. In some embodiments the frame is placed on a conveyor, with a seeding machine and a sprayer for the gel over a path of the conveyor. In some embodiments the frame, including the seeded substrate, is mounted on a wall frame. In some embodiments the substrate serves as a wall within the wall frame. In some embodiments the substrate serves as a panel of a wall boarded by the wall frame. In some embodiments the wall frame and the substrate, or multiple substrates in some embodiments, define a volume, for use in providing an aqueous mist environment.

Some embodiments include a method for use in aeroponic growth of plants, comprising: applying seeds to a substrate, the substrate in a generally horizontal position; applying a polymeric material in solution to the seeds and substrate, with the substrate in the generally horizontal position; and after the polymeric material adheres the seeds in position relative to the substrate, moving the substrate to a generally vertical position.

These and other aspects of the invention are more fully comprehended upon review of this disclosure.

DETAILED DESCRIPTION

Figure 1A:
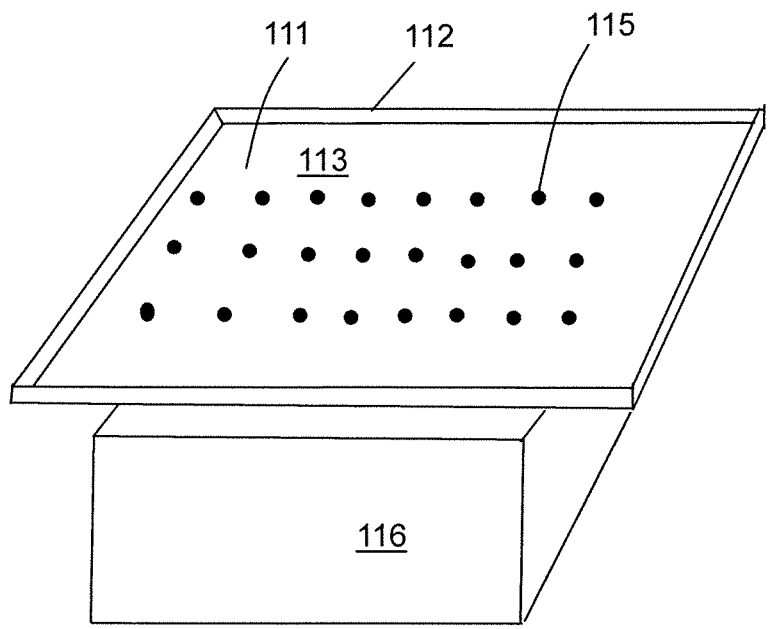
FIG. 1A is a perspective view of a seeded substrate, in a horizontal position in accordance with aspects of the invention.

FIG. 1A is a perspective view of a seeded substrate, in a horizontal position. In FIG. 1, a substrate 111 is within a frame 112. The substrate is, in some embodiments, comprised of a woven material, though in various embodiments various other materials may be used. The frame is optional, but in many embodiments having the substrate within the frame may be useful for moving or holding the substrate, or for stretching or holding the substrate in a desired configuration. To show that the substrate 111 is in a horizontal position, the frame and substrate are illustrated as being atop a platform 116.

Seeds 115 lie on the substrate, or over the substrate in some embodiments. The seeds are generally held in position with respect to the substrate by a polymeric material 113. In some embodiments the polymeric material may be a gel. In such embodiments a gelling material, in a solution in an ungelled state, may be applied to the seeds and substrate, with the gelling material gelling to the gelled state after application. In the gelled state, the gel generally adheres to the substrate, with the gel also over the seeds.

Figure 1B:
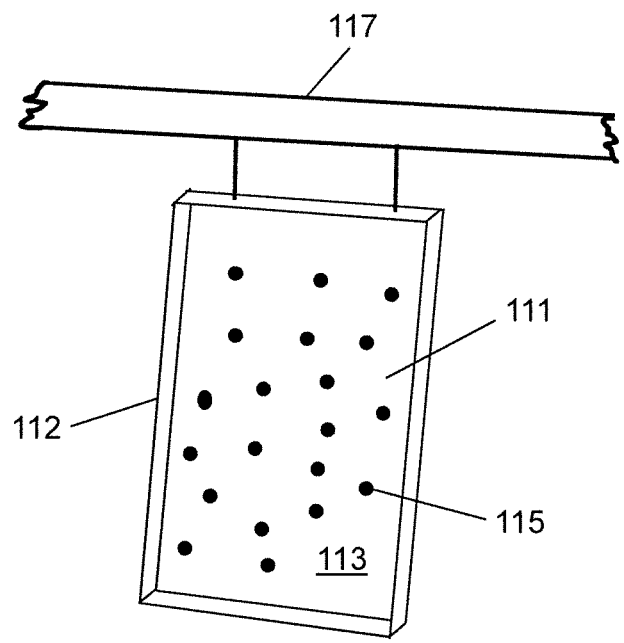
FIG. 1B is a perspective view of the seeded substrate of FIG. 1A, in a vertical position in accordance with aspects of the invention.

FIG. 1B is a perspective view of the seeded substrate of FIG. 1A, in a vertical position. In most embodiments the seeded substrate is moved from the horizontal position of FIG. 1A to the vertical position of FIG. 1B prior to germination of the seeds, and subsequent growth of plants from the germinated seeds. As with FIG. 1, the substrate 111 is within the frame 112. The frame is hanging from a support bar 117. The polymer 113, which may be a gel, is generally adhered to the substrate, with the seeds 115 generally held in position with respect to the substrate by the gel.

In most embodiments, water and nutrients may be applied to vertical seeded substrate, either to allow for germination of the seeds and/or to allow for plant growth from the germinated seeds. After germination, the vertical seeded substrate may also be exposed to light from time to time, allowing for plant growth from the germinated seeds. The water, nutrients, and light may be applied in an aeroponics growth system, for example.

Figure 2:
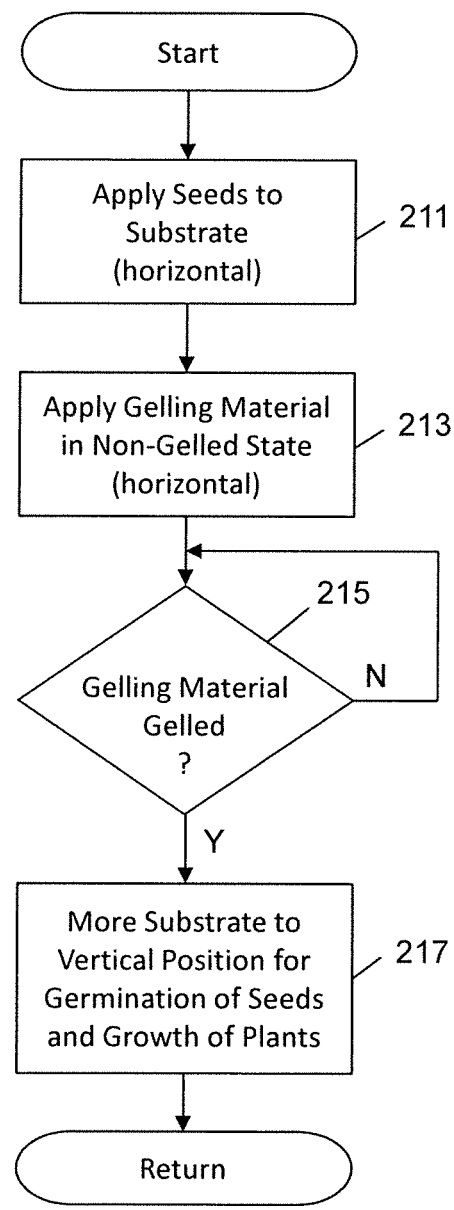
FIG. 2 is a flow diagram of a process for seeding a substrate in a horizontal position, and then allowing for seed germination and plant growth with the substrate in a vertical position in accordance with aspects of the invention.

FIG. 2 is a flow diagram of a process for seeding a substrate in a horizontal position, and then allowing for seed germination and plant growth with the substrate in a vertical position.

In block 211 of the process, seeds are applied to a substrate in a horizontal position. The substrate may be of a woven material in some embodiments, although in other embodiments the substrate may be otherwise formed or constructed. In some embodiments the woven material is a quilted fabric. In some embodiments the quilts are provided by melting patterns in the fabric. In some embodiments the patterns extend across the fabric such that when the fabric is hung vertically, the quilts extend horizontally across the fabric. Such an arrangement may slow propagation of liquid down the fabric. Generally, the substrate is generally planar in outline, with (in the horizontal position) tops and bottoms of the substrate having a much greater surface area than sides of the substrate. In some embodiments the substrate may be mounted within a frame, for example to maintain a shape of the substrate and/or to increase ease of handling of the substrate. The seeds may be applied to the substrate by dropping the seeds onto the substrate. In some embodiments the seeds are applied to the substrate so as to generally spread the seeds over the substrate, with spacings preferably between the individual seeds. In some embodiments the seeds may be applied to the substrate using a seeding machine.

In block 213 a polymer is applied to the substrate and seeds, with the substrate still in the horizontal position. The polymer may be a gelling material, with the gelling material applied to the substrate in solution. For example, some gelling materials may be remain in solution above a predetermined temperature, with the gelling material forming a gel when below the predetermined temperature. In some embodiments, therefore, a solution including gelling material heated to a temperature above the predetermined temperature may be applied to the substrate and seeds, with the gelling material gelling as it cools on the substrate. As illustrated in FIG. 2, operations of block 213 occur after operations of block 211. In some embodiments operations of block 213 occur prior to operations of block 211. In some embodiments operations of block 213 are performed both before and after operations of block 211. In some embodiments a thickness of the gel (measured normal for a planar surface of the substrate) is up to 1 cm. In some embodiments the thickness of the gel varies with size, for example a diameter, of the seeds, with for example thickness of the gel being greater for larger seeds.

Block 215 waits for the gelling material to sufficiently gel. In some embodiments the gelling material may gel very quickly, for example in a matter of seconds. In some embodiments the gelling material has sufficiently gelled once the gelling material has sufficiently adhered to the seeds and substrates that the gelling material will generally hold the seeds to the substrate when the substrate is moved to a vertical position.

In block 217 the substrate is moved to the vertical position. In most embodiments the movement of the substrate from the horizontal position to the vertical position occurs after the gelling material generally adheres the seeds to the substrate, but prior to germination of the seeds. In some embodiments the seeds may be applied to the substrate in a germinated state, or with some of the seeds germinated, but with insufficient time for the plants sprouting from the germinated seeds being able to on their own adhere to the substrate. In such instances the movement of the substrate from the horizontal position occurs after the gelling material generally adheres the germinated seeds to the substrate, but prior to the germinated seeds themselves adhering to the substrate. In some embodiments the substrate is maintained in a generally dark environment until the seeds, or a large percentage of the seeds, germinate. In some embodiments the substrate is maintained in a generally dark environment for a period in which the seeds are expected to generally germinate. In some embodiments the substrate, after seed germination, is first exposed to light of a lower intensity, for example light of an intensity of 50-150 PAR (photosynthetic active radiation), prior to being exposed to light of greater intensity, for example light of an intensity of 1200-1300 PAR. In some embodiments the substrate is exposed to the light of the lower intensity for a period of 1-2 hours. In some embodiments the substrate is exposed to the light of the lower intensity until the leaves of the plant from the germinated seeds turn green. In some embodiments the substrate is moved to the vertical position and placed within a grow container of an aeroponics system, for subsequent growth of plants from the seeds. In some embodiments the substrate is moved to the vertical position after the seeds have germinated. In some embodiments the substrate is moved to the vertical position after the substrate has been exposed to the light of the lower intensity.

The process thereafter returns.

Figure 3:
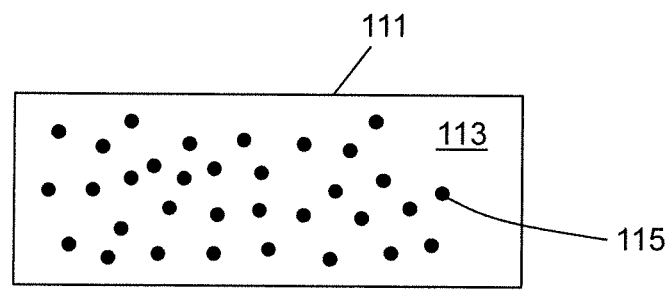
FIG. 3 is a top view of a seeded substrate in accordance with aspects of the invention.

FIG. 3 is an example view of a seeded substrate in accordance with aspects of the invention. The seeded substrate includes a substrate 111. A polymer layer (not explicitly shown in FIG. 3) is on a surface 113 of the substrate. Seeds 115 are on the surface of the substrate and/or on, in, or under the gel, depending on the embodiment. The seeds are shown greatly magnified in size for ease of viewing in FIG. 1, in most embodiments the seeds are much smaller than shown in FIG. 3, and the substrate holds many more seeds than are shown in FIG. 3.

The substrate of FIG. 3 is generally planar and rectangular in form, although in various embodiments the substrate may be circular, elliptical, square, or some other shape in form. In various embodiments the substrate is penetrable by roots of plants, during growth of the plants. In some embodiments the substrate may be provided by a screen, or some other integral or unitary formed metal or plastic structure including apertures therethrough, for example as molded or formed by stamping. In some embodiments the substrate is of a woven fiber. In some embodiments the substrate is at least partially absorbent to liquid. In some embodiments the substrate is hydrophilic. In some embodiments the substrate is hydrophobic. In some embodiments the polymer layer is comprised of a gel. In some embodiments the polymer layer comprises a hydrocolloid gel. In some embodiments the gel may be a gellum such as Gelrite. In some embodiments the seeds are seeds for green leaf edible plants. In some embodiments the seeds may be considered seeds for microgreens.

In most embodiments polymeric or gelling material is applied to the substrate as a solution, by a sprayer or the like, with the polymeric or gelling material solidifying or gelling into the gel after application to the sheet. In some embodiments the gelling material is a solution of a gel, at a temperature at which the gel is in a liquid state. In some embodiments the gelling material is in solution at or above some temperature above room temperature, with the gelling material heated to or above that some temperature, applied to the substrate, and then allowed to cool or gel. In some embodiments the solution includes between 25 mg and 200 mg, or between 75 mg and 125 mg, or 100 mg of Gelrite per liter of water, or in some embodiments per liter of fertigation solution. In some embodiments the solution includes between 2.5 g and 20 g, or between 7.5 g and 12.5 g, or 10 g of Gelrite per liter of water, or in some embodiments per liter of fertigation solution. In some embodiments the fertigation solution is slightly acidic, and/or includes trace amounts of one, some, or all of Sodium Nitrate or other nitrogen source, potassium, copper, zinc, manganese, iron, boron, calcium, and/or magnesium. In some embodiments the solution has a conductivity between 1.0 and 1.3, inclusive, milliSiemens per centimeter. In some embodiments the solution includes added calcium and/or magnesium cations so as to have seed conductivity. In some embodiments the solution includes calcium and/or magnesium cations to provide divalent ions to bind to carboxylic acids of the Gelrite. In some embodiments the seeds are applied to the substrate prior to the substrate being sprayed with the gelling material, in other embodiments the seeds are applied to the substrate after application of the gelling material, and prior to gelling of the gelling material in some embodiments. In some such embodiments, gelling material may be applied both before and after application of seeds to the substrate. In most embodiments the gelling material and the seeds are applied to an upward facing surface of the substrate, with the substrate lying in a generally horizontal plane. After application of the gelling material and the seeds to the substrate, the substrate may be placed so as to be lie in a generally vertical plane. This may be done, for example, immediately after application of the gelling material and the seeds to the substrate, in some embodiments or immediately after gelling of the gelling material, and prior to germination of the seeds in most embodiments. With the substrate lying in the generally vertical plane, in most embodiments a light source is provided on the side of the substrate with the gel and seeds, and an aqueous environment, for example a mist environment, is provided on the opposing side of the substrate. In some embodiments, however, the light source may not be provided until after germination of the seeds.

Figure 4A:
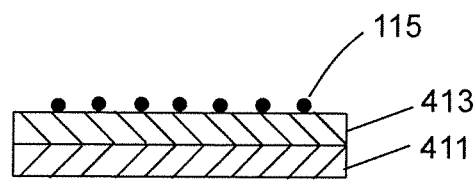
FIGS. 4A, 4B, and 4C are cross-sectional views of various embodiments of seeded substrates in accordance with aspects of the invention.

FIG. 4A is a representative cross-sectional view of an embodiment of a seeded substrate in accordance with aspects of the invention. A substrate 411 provides a substrate. The substrate may be, for example, of a woven material. In many embodiments the substrate is a water absorbent material. In some embodiments the substrate is opaque to light. In FIG. 4A, a layer of gel 413 is on top of and in contact with the substrate. The gel may be a hydrocolloid, for example gellum. In some embodiments the gel is Gelrite. In some embodiments the gel includes plant nutrients. Seeds 115 are shown atop the gel. The seeds in various embodiments may be partially within the gel, for example embedded in an upper surface of the gel. The seeded substrate may be prepared, for example, by spraying or otherwise applying the gel to a surface of the substrate, with seeds then dropped, sprayed, or otherwise applied to the gel present on the substrate.

Figure 4B:
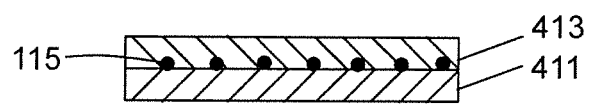

FIG. 4B is a further representative cross-sectional view of an embodiment of a seeded substrate in accordance with aspects of the invention. As with the embodiment of FIG. 4A, the substrate 411 provides a substrate. The substrate may be, for example, of a woven material. In many embodiments the substrate is a water absorbent material. In some embodiments the substrate is opaque to light. Unlike the embodiment of FIG. 4A, in the embodiment of FIG. 4B the seeds 115 are on top of and in contact with the substrate. The gel 413 provides a layer above the seeds. As the seeds are spread on the substrate, with in most embodiments space between at least some of the seeds, or even most or all of the seeds, the layer of gel is also in contact with the substrate in various locations.

Figure 4C:
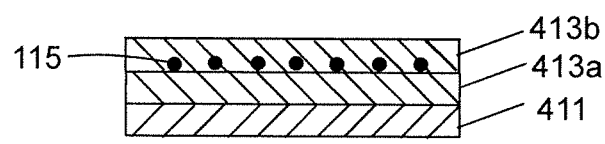

FIG. 4C is a yet further representative cross-sectional view of an embodiment of a seeded substrate in accordance with aspects of the invention. The embodiment of FIG. 4C is similar to that of FIG. 4A, with the substrate 411 providing a substrate for a first layer of the gel 413a. As with the embodiment of FIG. 4A, in the embodiment of FIG. 4C seeds 115 are atop or embedded in an upper surface of the first layer of gel 413a. In addition, in the embodiment of FIG. 4C a second layer of the gel 413b is provided on top of the seeds and the first layer of gel. In some embodiments the first and second layers of gel have the same composition. In various embodiments, however, the two layers may be of different composition.

Figure 5:
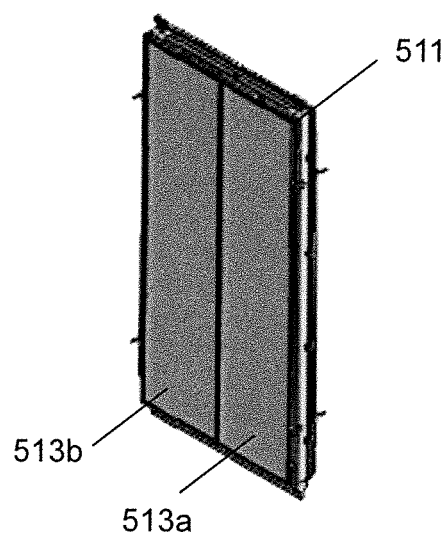
FIG. 5 is a perspective view of seeded substrates mounted to a wall frame, in accordance with aspects of the invention.

FIG. 5 is a perspective view of seeded substrates 513a,b mounted to a wall frame 513, in accordance with aspects of the invention. In the embodiment of FIG. 5, the seeded substrates are each generally rectangular in shape, and are mounted next to one another on one side of the wall frame. The seeded substrates may be as discussed with respect to FIGS. 1A,B, FIG. 3 and/or FIGS. 4A-C. Generally the seeded substrates include a substrate that may be considered to provide a substrate for seeds and a layer of gel. For ease of handling and mounting, the seeded substrates themselves may be mounted in frames, as for example illustrated in FIGS. 1A,B and/or FIG. 5.

As mounted, the seeded substrates effectively provide panels for one side of a wall, with edges and sides of the wall defined by the wall frame. In some embodiments the wall frame may provide for an opposing side of the wall. In other embodiments, however, additional seeded substrates may be mounted on the other side of the wall frame, with the additional seeded substrates providing the opposing side of the wall. In either case, the wall frame and seeded substrates provide a wall like structure with an internal space. Generally, seeded sides of the seeded substrates face outward from the wall-like structure, and a mist environment may be provided in the internal space. The mist environment, for example, may be introduced by sprayers within the internal space. Openings may be provided in the sides, or the top, of the wall frame, to allow for piping and the like to provide liquid to the sprayers. Similarly, light sources may be arranged outside of the wall-like structure, to provide light to the seeds of the seeded substrates. Preferably the seeded substrates provide vertical walls of the wall-like structure.

Figure 6:
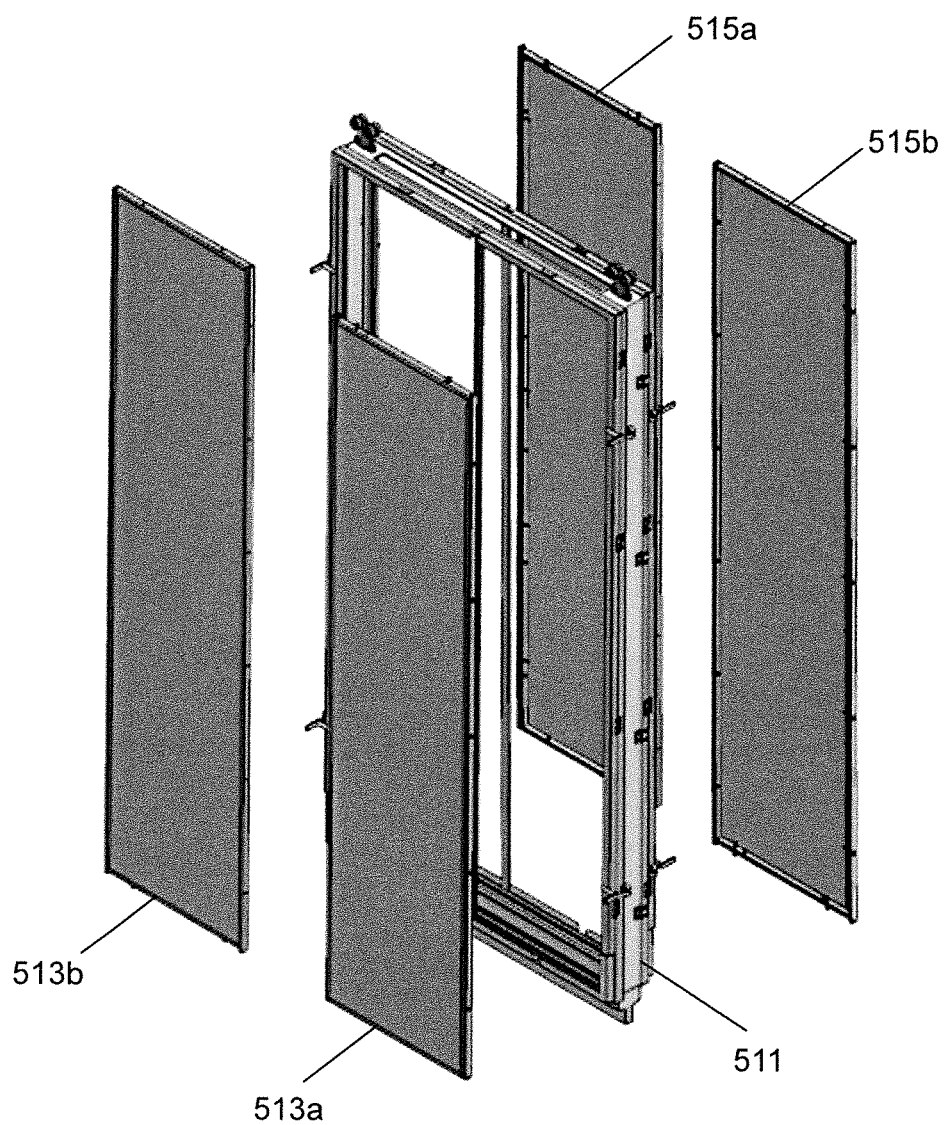
FIG. 6 is an exploded view of seeded substrates and a dual sided wall frame, in accordance with aspects of the invention.

FIG. 6 is an exploded view of seeded substrates 513a,b, 515a,b and a dual sided wall frame 511, in accordance with aspects of the invention. In some embodiments, and as illustrated in FIG. 6, the seeded substrates provide vertical panels of a wall like structure, with dimensions of the wall-like structure defined by the wall frame.

In FIG. 6, first and second rectangular seeded substrates 513a,b are for mounting on one side of the wall frame, within an outline defined by the wall frame, and with the seeded substrates arranged in a coplanar manner and next to one another. The seeded substrates may be themselves held in frames, with the frames held in place in the wall frame by clips, compressing fittings, or other means. Similarly, third and fourth rectangular seeded substrates 515a,b are for mounting on an opposing side of the wall frame, also within an outline defined by the wall frame, and also with the seeded substrates arranged in a coplanar manner and next to another. So mounted, the seeded substrates generally provide for sides of a wall structure, with side walls and top and bottom edges of the wall structure provided by the wall frame. With the substrates on opposing sides of the wall frame, the assembly comprised of the substrates and wall frame may be considered a bilateral grow wall. In some embodiments a plurality of bilateral grow walls may be arranged linearly, for example hanging from a linear rail. Bilateral grow walls so arranged (or one-sided grow walls so arranged) may be considered a grow train. In some embodiments such a rail, or plural parallel rails, may be provided in an enclosure, with grow trains hanging from each rail.

As may be seen in FIG. 6, the side walls provided by the wall frame provide for separation and space between the seeded substrates 513a,b and the seeded substrates 515a,b. Preferably the space is sufficient that roots of plants that grow from the seeds of the seeded substrates 513a,b do not interfere with roots of plants that grow from the seeds of the seed substrates 515a,b. In addition, the space, which may be considered an interior space of the wall like structure, may be filled with an aquaeous mist. For germination purposes, water of the mist in the interior space may pass through and/or be transported by the substrate and provide hydration for the gel and seeds. After germination, the mist may provide nutrients to roots of the resulting plants, with the roots extending through the substrate into the interior space. In most embodiments the plants will grow on the substrates mounted on the wall frame, until at least the plants are ready for harvesting.

Figure 7:
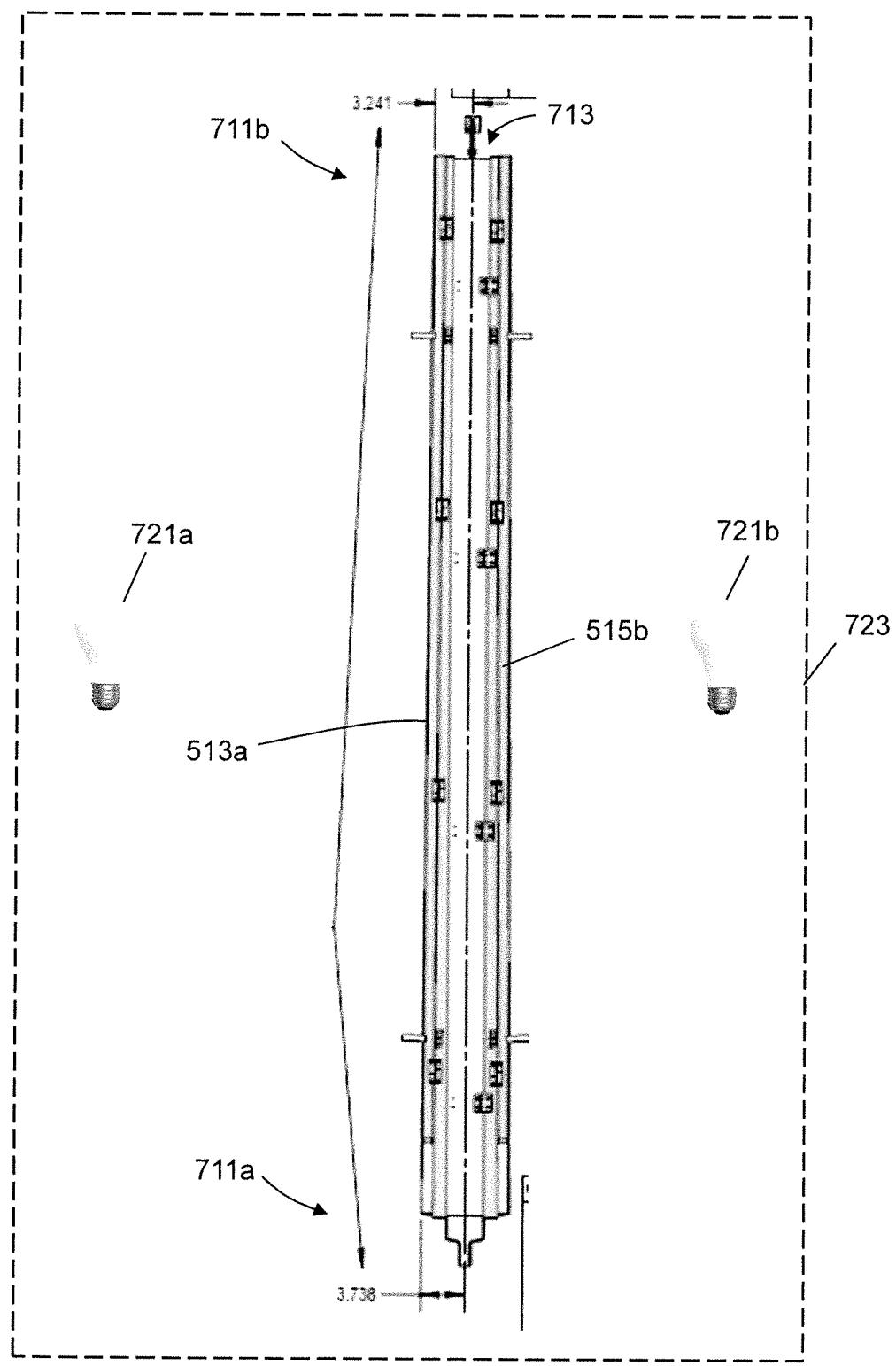
FIG. 7 is a side view of the seeded substrates and dual sided wall frame in accordance with aspects of the invention.

FIG. 7 is a side view of seeded substrates 513a, 515b and a dual sided wall frame, which define an interior space, 713 in accordance with aspects of the invention. The seeded substrates and wall frame together form a wall like structure, with the seeded substrates providing opposing sides of the wall, and the wall frame providing side edges of the wall. The wall like structure may have a top edge 711b hung from a rack or other structure. The bottom edge 711a of the wall may hang freely, or run in races, or simply be constrained by piping (which may be tubing or hoses or the like) for providing liquid to sprayers or nozzles within the interior space of the wall like structure. In addition, for further ease of comprehension, light sources 721a and 721b are shown exterior to the wall like structure, with the light sources positioned to provide light to outer surfaces of the seeded substrates. The light sources may be configured to provide light about various wavelengths conducive for plant growth. In addition, the wall like structure and light sources may be housed in a room or container 523, so as to provide further environmental control for plant growth.

In the embodiment of FIG. 7, the top edge has a width between the seeded substrates that is smaller than a width between the seeded substrates of the bottom edge. Due to the variation of width between the top edge and the bottom edge, the seeded substrates are arranged so as to have a negative camber angle. Such an arrangement may be beneficial for a variety of reasons. For example, as plants grow from the seeds of the seeded substrates, the roots of the plants extend into the interior space of the wall like structure. Condensation from the mist environment of the interior space may form on those roots. With the negative camber angle, however, drops from such condensation are less likely to run against the substrates.

Figure 8:
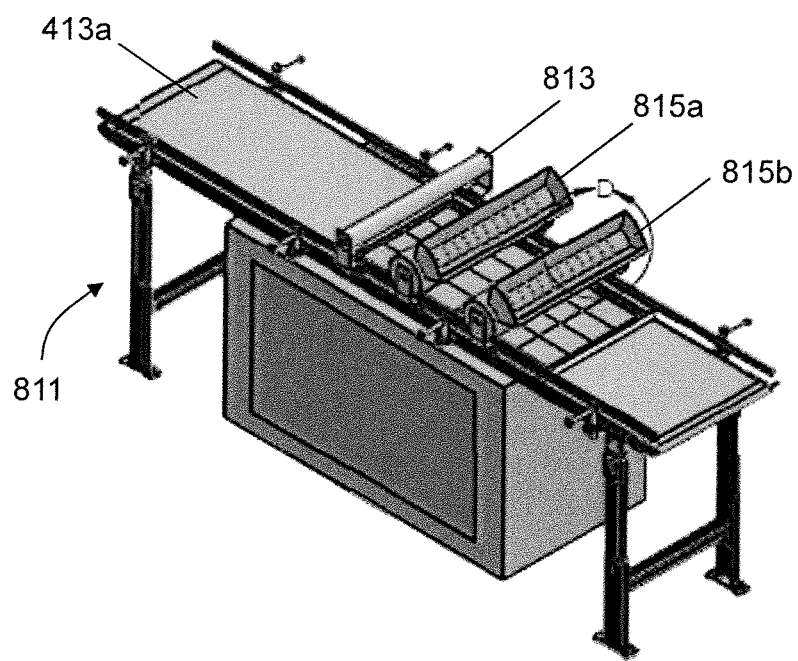
FIG. 8 is a perspective view of a seeding and gel application apparatus in accordance with aspects of the invention.

FIG. 8 is a perspective view of a seeding and gel application apparatus in accordance with aspects of the invention. The apparatus includes a frame 811 for a conveyor belt. A substrate 513a (a seeded substrate, as the substrate is exiting the apparatus), is on the conveyor belt. Arranged over the conveyor belt, and hence the substrate, are a pair of seeding machines 815a,b. In some embodiments only a single seeding machine may be used. In some embodiments different ones of the seeding machines may provide seeds from different plants, or different varieties of plants. The seeding machines, as illustrated, are cylindrical drum seeding machines, configured to drop seeds over a width of the conveyor belt at a predetermined rate. Speed of the conveyor belt and the predetermined rate therefore provide for a generally predetermined number of seed per linear distance over the substrate.

A gelling solution applicator 813 is also arranged over the conveyor belt. In most embodiments the substrate is first passed under the seeding machines(s), and then passed under the gelling solution applicator. The gelling solution applicator may have nozzles or sprayer heads for spraying gelling material, in solution, onto the substrate carried by the conveyor belt. The gelling material applicator may be configured to spray a predetermined quantity of solution over a predetermined quantity of time. This, along with speed of the conveyor belt, also allows for application of a generally predetermined thickness of gel over the substrate. In some embodiments the gelling material is held in a heated reservoir, heated above a gelling temperature of the gelling material, with the gelling material, in solution, provided to the gelling material applicator. In some embodiments, in addition, heating elements may be provided right before or with nozzles of the gelling material applicator, to assist in ensuring that the gelling material does not gel prior to application to the substrate.

In the embodiment of FIG. 6, the seeding machines and the gel applicator are arranged such that portions of the substrate first pass under the seeding machines and then pass under the gel applicator. In other embodiments the relative positions of the seeding machines and gel applicator may be reversed. Similarly, only one seeding machine may be used, and in various embodiments multiple gel applicators may be used.

Although the invention has been discussed with respect to various embodiments, it should be recognized that the invention comprises the novel and non-obvious claims supported by this disclosure.

What is claimed is:

1. A method for use in aeroponic growth of plants, comprising:
    applying seeds to a substrate, the substrate in a generally horizontal position;
    applying a polymeric material in solution to the seeds and substrate, with the substrate in the generally horizontal position; and
    after the polymeric material adheres the seeds in position relative to the substrate, but prior to germination of the seeds, moving the substrate to a generally vertical position.

2. The method of claim 1, where the polymeric material in solution is a gelling material in solution.

3. The method of claim 2, wherein the gelling material adheres the seeds in position relative to the substrate upon the gelling material undergoing gelling.

4. The method of claim 3, wherein the gelling material in solution is applied to the seeds and substrate at a temperature above a gelling temperature of the gelling material.

5. The method of claim 4, wherein the substrate is a woven material.

6. The method of claim 5, wherein the substrate is held within a frame.

7. The method of claim 2, wherein the gelling material in solution comprises between 25 milligrams and 200 milligram of gelling material per liter of fluid.

8. The method of claim 2, wherein the gelling material in solution comprises between 75 milligrams and 125 milligrams of gelling material per liter of fluid.

9. The method of claim 1, wherein moving the substrate to the generally vertical position comprises moving the substrate to a generally vertical position in a grow chamber of an aeroponics grow system.

* * * * *